United States Patent
Isaki et al.

(10) Patent No.: US 8,557,154 B2
(45) Date of Patent: Oct. 15, 2013

(54) PROCESS FOR PRODUCTION OF POLYOLEFIN PELLETS

(75) Inventors: Takeharu Isaki, Chiba (JP); Takeshi Karino, Ichihara (JP); Noriyuki Katoh, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 328 days.

(21) Appl. No.: 12/740,195

(22) PCT Filed: Oct. 31, 2008

(86) PCT No.: PCT/JP2008/003137
§ 371 (c)(1),
(2), (4) Date: Jul. 15, 2010

(87) PCT Pub. No.: WO2009/057318
PCT Pub. Date: May 7, 2009

(65) Prior Publication Data
US 2010/0295205 A1   Nov. 25, 2010

(30) Foreign Application Priority Data
Oct. 31, 2007 (JP) ................................ 2007-282948

(51) Int. Cl.
*B29B 9/06* (2006.01)
(52) U.S. Cl.
USPC .............................................. 264/142; 264/5
(58) Field of Classification Search
USPC ...................................................... 264/142, 5
See application file for complete search history.

(56) References Cited

U.S. PATENT DOCUMENTS

| 5,911,928 A | 6/1999 | Shimazu et al. |
| 2002/0053752 A1 | 5/2002 | Takei et al. |

FOREIGN PATENT DOCUMENTS

| JP | 61-195808 | 8/1986 |
| JP | 01-234212 | 9/1989 |
| JP | 05-228923 | 9/1993 |
| JP | 05-301218 | 11/1993 |
| JP | 08-90556 | 4/1996 |
| JP | 11-254431 | 9/1999 |
| JP | 2002-166418 | 6/2002 |

OTHER PUBLICATIONS

Osswald, Tim, "Polymer Processing Fundamentals", Hanser/Gardner publications, 1998.*
International Search Report for PCT/JP2008/003137 mailed Jan. 20, 2009.

* cited by examiner

*Primary Examiner* — Galen Hauth
(74) *Attorney, Agent, or Firm* — Rankin, Hill & Clark LLP (57) ABSTRACT

A process for the production of polyolefin pellets by cuffing a raw material which contains a molten polyolefin resin and which is extruded from an extrusion orifice (121) of a die (12) into predetermined lengths with an underwater cutter (14) which is set in close vicinity to the die face of the die (12) and which rotates in water, satisfying the following requirements (A) to (C): (A) the average linear velocity (u) of the raw material passing through the extrusion orifice (121) as defined by the equation (Eq-1) is 50 to 650 mm/sec, (B) the fictitious aspect ratio (r) as defined by the equation (Eq-2) is 1.6 or below, and (C) the r/u value is 0.002 or above wherein Q is extrusion rate ($mm^3$/sec) of the raw material per extrusion orifice; R is radius (mm) of the extrusion orifice; and t is cutting time (sec) defined as an inverse number of the product of the number of revolution of the under-water cutter and the number of blades of the cutter.

13 Claims, 3 Drawing Sheets

PROCESS FOR PRODUCTION OF POLYOLEFIN PELLETS

TECHNICAL FIELD

The present invention relates to a method for preparing polyolefin pellets.

BACKGROUND ART

Conventionally, in the preparation of polyolefin pellets, a strand cutting method or an underwater cutting method has been in general use.

The strand cutting method is a method in which a molten polyolefin resin is extruded through a nozzle with a strand shape, cooled, and then cut to a certain length (see Patent Document 1).

In this preparation method, the pellets are likely to change shapes, and it is difficult to maintain the shapes of the pellets to be constant.

In this regard, a granulation device as set forth in Patent Document 1 has been proposed.

In this granulation device, a weight of a pellet per unit time is detected by a weight detecting device.

In addition, a slit valve for extruding a polyolefin resin with a strand shape is provided with the device for modulating a degree of openness of a slit valve, and the weight of a pellet per unit time is fed back to the device for modulating a degree of openness of a slit valve.

In the device for modulating a degree of openness of a slit valve, a difference between a weight of a pellet per unit time as detected by the weight detecting device and a normal value is calculated, and based on the calculated result, the degree of openness of a slit valve is modulated.

By this, as described in Patent Document 1, the shape of the pellets can be kept constant. However, the strand cutting method basically has a problem that the production capability is extremely lowered, as compared with the underwater cutting method.

The underwater cutting method is a method in which a cutter in contact with the die surface rotates at a high speed, whereby a resin emerging from the die orifice is continuously cut at a high speed. Water usually flows in the cut segment, and accordingly, the cut resin and water are allowed to flow together, and finally to be dehydrated and dried. For example, Patent Document 2 describes that abrasion of a cutter knife can be prevented, and the generation of plugging can also be prevented by controlling the pressure of a cutter knife. Further, Patent Document 2 does not disclose a granulated pellet shape.

[Patent Document 1] JP-A-11-254431
[Patent Document 2] JP-A-5-228923

DISCLOSURE OF THE INVENTION

Recently, there has been demand that the shape of the pellets should be uniform, and further, the shape of a pellet should be a spherical shape.

This is due to the fact that when the pellets are in contact with each other, the contact area between the pellets can be reduced, and particularly, for a polyolefin having a low melting point, it is a requirement to have a spherical shape as a shape that does not block easily.

Patent Document 1 describes that the shape of a pellet can be made uniform, but does not go as far as to disclose whether the shape can be controlled.

Further, in Patent Document 2, there is no recognition that the shapes of pellets should be uniform.

By the method for preparing disclosed in Patent Documents 1 and 2, it is difficult to prepare pellets in the spherical shapes stably.

The present invention aims to provide a method for preparing polyolefin pellets capable of stably preparing polyolefin pellets in the spherical shape.

The present inventors have conducted experiments by preparing polyolefin pellets under various conditions, and as a result, we have found that polyolefin pellets in the spherical shape are stably obtained by satisfying the following conditions (1) to (3) simultaneously.

Furthermore, the results of the experiments will be described in detail in Examples.

(1) Firstly, the average linear velocity u of a raw material passing through the opening on the outlet side of the extrusion orifice is set to be within a predetermined range.

The average linear velocity u is expressed in $Q/\pi R^2$ (mm/sec), obtained by dividing the extrusion flow rate Q of the raw material by the area of the extrusion orifice.

It was found that if the average linear velocity u of the raw material passing through the opening on the outlet side of the extrusion orifice is too high, specifically, more than 650 mm/sec, the shape of the polyolefin pellets tends to be likely to be in a cylindrical shape.

Also, it was found that if the average linear velocity u of the raw material passing through the opening on the outlet side of the extrusion orifice is too low, specifically, less than 50 mm/sec, the amount of the raw material extruded from the extrusion orifice per unit time is reduced, and accordingly, there is a tendency that it is difficult to obtain polyolefin pellets in the spherical shape stably, or the extrusion orifice is easily obstructed.

(2) Secondly, if the raw material is extruded in the cylindrical shape from the extrusion orifice of the die, a ratio r of the height of the cylinder to the diameter of the circular surface (which may also be referred to as a "virtual aspect ratio" in some cases) is set to a predetermined value.

Here, the virtual aspect ratio r can be determined by multiplying the average linear velocity u of the raw material with the cutting time t as defined as an inverse number of the product of the number of revolutions of the underwater cutter and the number of blades of the underwater cutter, and then dividing the product by the diameter of the extrusion orifice.

This virtual aspect ratio is not consistent with the actually obtained aspect ratio of the polyolefin pellets. However, under the conditions of the average linear velocity of (1) as described above and the condition of (3) as described below, the virtual aspect ratio r becomes indicative of the shape of the polyolefin pellets to be actually obtained.

Specifically, it was found that polyolefin pellets in the spherical shape can be stably prepared by setting the virtual aspect ratio r to equal to or less than 1.6, setting the average linear velocity to satisfy a predetermined condition of (1) as described above, and further satisfying the condition of (3) as described below.

In the case where the virtual aspect ratio is more than 1.6, the shape of the polyolefin pellets tends to be in the cylindrical shape.

(3) Third, r/u as obtained by dividing the virtual aspect ratio r by the average linear velocity u is set to equal to or more than 0.002.

The present inventors have found that pellets in the spherical shape can be stably prepared by specifying the relationship between the virtual aspect ratio r and the average linear velocity u.

According to the knowledge of the present inventors, it was found that the virtual aspect ratio r is not consistent with the actual aspect ratio of the polyolefin pellet, and the lower limit of the virtual aspect ratio which allows the obtaining of polyolefin pellets in the spherical shape according to the increase in the average linear velocity u increases, as described above.

Specifically, it was found that, in the case where r/u as obtained by dividing the virtual aspect ratio r by the average linear velocity u is equal to or more than 0.002, polyolefin pellets in the spherical shape can be stably obtained.

As described above, according to the present invention, provided is a method for preparing polyolefin pellets by cutting a raw material containing a molten polyolefin resin which is extruded from an extrusion orifice formed on the die surface of a die into a predetermined length with an underwater cutter which is set in close vicinity to the die surface of the die and rotates in water, thereby obtaining polyolefin pellets, wherein the method satisfies the following conditions (A) to (C) simultaneously:

(A) the average linear velocity u of the raw material passing through the extrusion orifice as defined by the equation (Eq-1) is equal to or more than 50 mm/sec and equal to or less than 650 mm/sec, (B) the virtual aspect ratio r as defined by the equation (Eq-2) is equal to or less than 1.6, and (C) r/u as obtained by dividing the virtual aspect ratio r by the average linear velocity u is equal to or more than 0.002.

[Equation 1]

$$u = \frac{Q}{\pi \times R^2} \quad \text{(Eq-1)}$$

[Equation 2]

$$r = \frac{Q \times t}{2 \times \pi \times R^3} \quad \text{(Eq-2)}$$

[in the equations (Eq-1) and (Eq-2), Q is an extrusion flow rate ($mm^3$/sec) of the raw material per orifice of the extrusion orifices, R is a radius (mm) of the extrusion orifice, and t is a cutting time (sec) defined as an inverse number of the number which is obtained by multiplying the number of revolutions of the underwater cutter by the number of blades of the underwater cutter].

According to the present invention, polyolefin pellets in the spherical shape can be stably prepared.

More specifically, in the case where the average linear velocity u is more than 650 mm/sec, the shape of the polyolefin pellets is likely to be in the cylindrical shape.

Further, in the case where the average linear velocity u is less than 50 mm/sec, it becomes difficult to obtain polyolefin pellets in the spherical shape stably. In addition, in the case where the average linear velocity is less than 50 mm/sec, the productivity of the polyolefin pellets becomes lower.

On the contrary, in the present invention, since the average linear velocity is set to equal to or less than 650 mm/sec and equal to or more than 50 mm/sec, the polyolefin pellet can be inhibited from being in the cylindrical shape or in the flat shape, and accordingly, polyolefin pellets in the spherical shape can be stably prepared with good productivity.

Furthermore, in the case where the virtual aspect ratio is more than 1.6, the shape of the polyolefin pellets is likely to be in the cylindrical shape. Polyolefin pellets in the spherical shape can be stably prepared by setting the virtual aspect ratio to equal to or less than 1.6 under the conditions (A) and (C).

In addition, polyolefin pellets in the spherical shape can be stably prepared by setting r/u as obtained by dividing the virtual aspect ratio r by the average linear velocity u to equal to or more than 0.002 under the conditions (A) and (B).

Moreover, it is preferable that the upper limit of r/u be 0.01 in view of the average linear velocity of the raw material and the virtual aspect ratio as set under the conditions (A) and (B).

Here, the r is preferably equal to or less than 0.9 or equal to or more than 1.1.

As a result of the investigation conducted by the present inventors, it was found that polyolefin pellets in the spherical shape can be prepared with higher reproducibility by setting the virtual aspect ratio r to equal to or less than 0.9 or equal to or more than 1.1 according to the characteristics of the resin. For example, in the case where a polyolefin resin having a melting point of equal to or lower than 80° C. is used, it is preferable to set r to equal to or less than 0.9.

In addition, polyolefin pellets in the spherical shape can also be prepared by suitably adjusting the preparation condition to set r to a value of more than 0.9 and less than 1.1.

Here, r≤0.002u+0.65 is preferred.

As described above, according to the knowledge of the present inventors, the virtual aspect ratio r is not consistent with the aspect ratio of the polyolefin pellet to be actually obtained.

It was found that in order to set the aspect ratio of the polyolefin pellet to be actually obtained to approximately 1 and make the shape of the polyolefin pellet spherical, it is particularly preferable to change the virtual aspect ratio r according to the change in the average linear velocity u.

For example, it was found that by setting the virtual aspect ratio r to be low in the case that the average linear velocity u is low, and by setting the virtual aspect ratio r to be high in the case that the average linear velocity u is high, polyolefin pellets in the spherical shape can be prepared with good reproducibility as well as with a high yield, and polyolefin pellets in the spherical shape could be obtained more stably.

Specifically, by setting r and u in the range of r≤0.002u and r≤0.002u+0.65, polyolefin pellets in the spherical shape can be prepared with good reproducibility, as well as with a high yield.

Further, r≤0.002u+0.5 is more preferred.

Here, by setting the average linear velocity u to equal to or less than 300 mm/sec, polyolefin pellets in the spherical shape can be obtained with a higher yield.

On the other hand, the average linear velocity u may be equal to or less than 200 mm/sec, and the virtual aspect ratio r may be equal to or more than 1.1.

In the case where the average linear velocity is equal to or less than 200 mm/sec, polyolefin pellets in the spherical shape can be prepared more stably by adjusting the cutting time (t) of the underwater cutter, and the like to set the virtual aspect ratio to equal to or more than 1.1.

Furthermore, the polyolefin resin is a (co)polymer of one or more monomers selected from ethylene, propylene, 1-butene, 1-hexene, 4-methyl-1-pentene, and 1-octene, and particularly preferably, one having at least any one of a polymer having an ethylene-derived backbone concentration of equal to or more than 50 mol % (which may be hereinafter simply referred to as an "ethylene-based polymer (P1)" in some cases), a polymer having a propylene-derived backbone concentration of equal to or more than 50 mol % (which may be hereinafter simply referred to as a "propylene-based polymer (P2)" in some cases), and a polymer having a 1-butene-derived backbone concentration of equal to or more than 50 mol % (which may be hereinafter simply referred to as a "butene-based polymer (P3)" in some cases) is preferred.

In addition, the density of the polyolefin resin is preferably in the range of 800 to 970 kg/m3, and more preferably in the range of 830 to 960 kg/m3. Further, as for the appropriate range of the melt flow rate (MFR) of the polyolefin resin, for the ethylene-based polymer (P1), the MFR at 190° C. under a load of 2.16 kg is from 0.05 to 50 g/10 min, and preferably from 0.1 to 30 g/10 min, for the propylene-based polymer (P2), the MFR at 230° C. under a load of 2.16 kg is from 0.1 to 200 g/10 min, and preferably from 0.2 to 50 g/10 min, and for the butene-based polymer (P3), the MFR at 190° C. under a load of 2.16 kg is from 0.05 to 50 g/10 min, and preferably from 0.1 to 30 g/10 min.

By employing the resin as described above as the polyolefin resin, a pellet in the spherical shape can be prepared more stably.

According to the present invention, a method for preparing polyolefin pellets, by which polyolefin pellets in the spherical shape can be stably prepared, is provided.

BRIEF DESCRIPTION OF THE DRAWINGS

The above-described objects and other objects, characteristics, and advantages are further clarified with reference to appropriate embodiments to be described below and the accompanying drawings.

BEST MODE FOR CARRYING OUT THE INVENTION

Hereinbelow, the present invention will be described based on the embodiments of the present invention.

Figure 1:
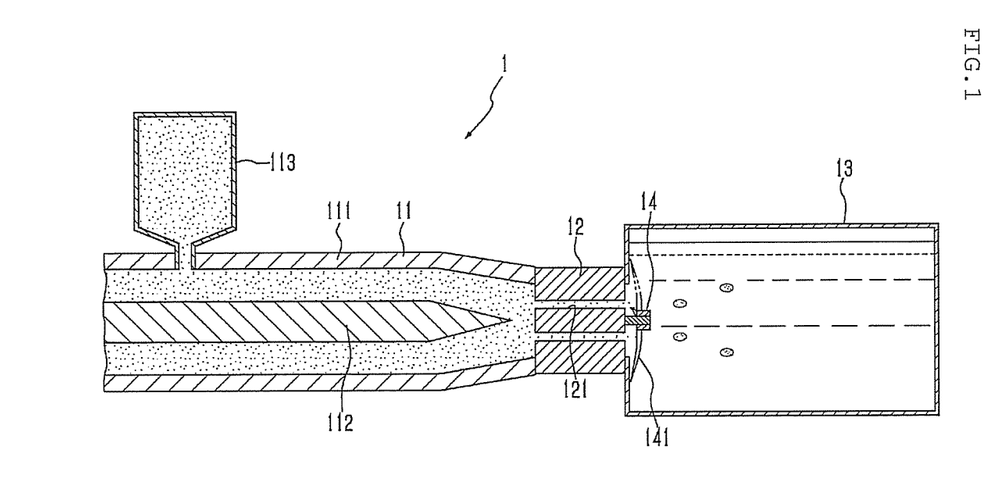
FIG. 1 is a schematic view illustrating the extrusion device according to one embodiment of the present invention.
Figure 2:
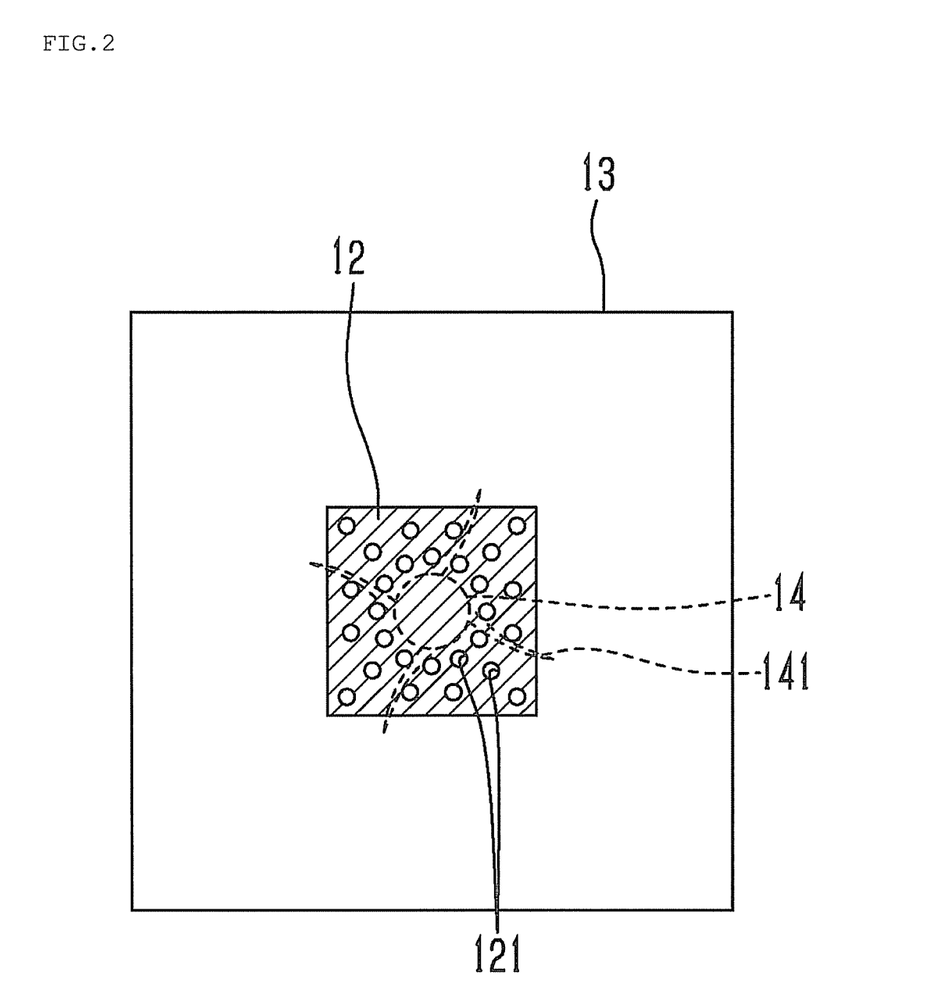
FIG. 2 is a schematic view illustrating the underwater cutter and the extrusion orifice according to one embodiment of the present invention.

With reference to FIGS. 1 and 2, the present embodiments are described.

First, the summary of the method for preparing polyolefin pellets of the present embodiment is described.

The method for preparing polyolefin pellets in the spherical shape of the present embodiment is a method for preparing polyolefin pellets by cutting a raw material containing a molten polyolefin resin which is extruded from an extrusion orifice 121 formed on the die surface of a die 12 into a predetermined length with an underwater cutter 14 which is set in close vicinity to the die surface of the die 12 and rotates in water, thereby obtaining polyolefin pellets, wherein the method satisfies (A) to (C) below simultaneously:

(A) the average linear velocity u of the raw material passing through the extrusion orifice 121 as defined by the equation (Eq-1) is equal to or more than 50 mm/sec and equal to or less than 650 mm/sec, (B) the virtual aspect ratio r as defined by the equation (Eq-2) is equal to or less than 1.6, and (C) r/u as obtained by dividing the virtual aspect ratio r by the average linear velocity u is equal to or more than 0.002.

[Equation 3]
$$u = \frac{Q}{\pi \times R^2} \quad (\text{Eq-1})$$

[Equation 4]
$$r = \frac{Q \times t}{2 \times \pi \times R^3} \quad (\text{Eq-2})$$

[in the equations (Eq-1) and (Eq-2), Q is an extrusion flow rate (mm³/sec) of the raw material per orifice of the extrusion orifices 121, R is a radius (mm) of the extrusion orifice 121, and t is a cutting time (sec) defined as an inverse number (sec) of the number which is obtained by multiplying the number of revolutions of the underwater cutter 14 by the number of blades 141 of the underwater cutter 14]

Hereinbelow, the method for preparing polyolefin pellets of the present embodiment will be described in detail.

In the present embodiment, in the preparation of the polyolefin pellets, a granulation device 1 as shown in FIG. 1 is used. Further, as used in the present invention, the "spherical shape" encompasses a completely spherical shape as well as an ellipsoidal shape. In the pellets in the spherical shape obtained in the present invention, two cut flat surfaces formed by the underwater cutter 14 do not exist, while the circumferential surface is curved toward the outer side.

To determine whether the polyolefin pellet is in the spherical shape or not, a method in which the shapes of a total of 100 to 150 pellets taken randomly are observed directly with the naked eyes or by a lupe is used. A case where the number of the pellets in the spherical shape constitutes equal to or more than 90% of the total number indicates that "the pellet in the spherical shape is stably prepared".

The granulation device 1 is equipped with an extruder 11, a die 12 disposed at the end of the extruder 11, a water bath 13, and an underwater cutter 14 as a cutting means.

The extruder 11 has a cylinder 111, and a screw 112 disposed in the cylinder 111.

The base end part of the cylinder 111 is connected with a hopper 113, and a raw material is supplied to the inside of the cylinder 111 by introducing the raw material for a polyolefin pellet into the hopper 113.

In the inside of the cylinder 111, the raw material is plasticized by the screw 112.

The die 12 is connected to the end part of the cylinder 111.

A plurality of extrusion orifices 121 are provided in the die 12, and the molten raw material is extruded from each of the extrusion orifices 121.

Here, in the present embodiment, the areas of the extrusion orifices 121 are equivalent to each other, and the extrusion flow rate Q is a value obtained by dividing the extrusion flow rate of the total raw material extruded from the die 12 by the total number of the extrusion orifices 121.

The end of the die 12 is connected to the water bath 13, and the raw material containing the molten polyolefin resin discharged from the die 12 is cut with an underwater cutter 14 which is set in contact with the die surface (the surface on which the extrusion orifice 121 is formed) in the water bath 13 and rotates at a high speed.

A front view of the underwater cutter 14 is illustrated in FIG. 2. The die surface of the die 12 is provided with a plurality of the blades 141 around the rotating plate which is a disc, and the blades 141 cut the raw material by rotating the rotating plate.

Next, a method for preparing polyolefin pellets using such a granulation device 1 will be described.

Examples of the polyolefin resin in the "raw material containing a polyolefin resin" include a homopolymer of an olefin, a copolymer of two or more kinds of olefins, and a block copolymer obtained by homopolymerizing an olefin, and then block-polymerizing the copolymerized part of two or more kinds of olefins.

The polyolefin resin is a (co)polymer of at least one monomer selected from ethylene and an α-olefin having 3 to 20 carbon atoms. Examples of the α-olefin having 3 to 20 carbon atoms include propylene, 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methyl ethyl-1-butene, 1-octene, methyl-1-pentene, ethyl-1-hexene, dimethyl-1-hexene, propyl-1-heptene, methyl ethyl-1-heptene, trimethyl-1-pentene, propyl-1-pentene, diethyl-1-butene, 1-nonene, 1-decene, 1-undecene, 1-dodecene, and the like. Among these monomers, ethylene, propylene, 1-butene, 1-hexene, 4-methyl-1-pentene, and 1-octene are preferred. Further, as necessary, for example, no polyolefin resin containing a backbone derived from polar group-containing olefins such as acrylic acid, methacrylic acid, methyl methacrylate, fumaric acid, anhydrous maleic acid, an aromatic vinyl compound, and the like, olefins in the ring shape such as norborene, 5-methyl-2-norborene, tetracyclododecene, and the like, and polyenes in the non-conjugated ring shape such as 5-vinyl-2-norborene and the like is excluded.

Among these polyolefin resins, from the viewpoint of the extrudability and the moldability of the resin, and the like, at least one selected from a polymer having an ethylene-derived backbone concentration of equal to or more than 50 mol % (which may be hereinafter simply referred to as an "ethylene-based polymer (P1)" in some cases), a polymer having a propylene-derived backbone concentration of equal to or more than 50 mol % (which may be hereinafter simply referred to as a "propylene-based polymer (P2)" in some cases), and a polymer having a 1-butene-derived backbone concentration of equal to or more than 50 mol % (which may be hereinafter simply referred to as a "butene-based polymer (P3)" in some cases) is preferable, and the ethylene-based polymer (P1), the propylene-based polymer (P2), or the "butene-based polymer (P3)" is more preferable.

Further, the density of the polyolefin resin is preferably in the range of 800 to 970 kg/m3, and more preferably in the range of 830 to 960 kg/m3. As for the appropriate range of the melt flow rate (MFR) of the polyolefin resin, for the ethylene-based polymer (P1), the MFR at 190° C. under a load of 2.16 kg is from 0.05 to 50 g/10 min, and preferably from 0.1 to 30 g/10 min, for the propylene-based polymer (P2), the MFR at 230° C. under a load of 2.16 kg is from 0.1 to 200 g/10 min, and preferably from 0.2 to 50 g/10 min, and for the butene-based polymer (P3), the MFR at 190° C. under a load of 2.16 kg is from 0.05 to 50 g/10 min, and preferably from 0.1 to 30 g/10 min.

Furthermore, a part of the polyolefin resin may be graft-modified by a polar monomer such as anhydrous maleic acid. Such a modified polyolefin resin is obtained by graft-polymerizing the polarmonomers with the coexistence of an organic peroxide, a diazo compound, or the like.

In addition, in "the raw material containing a polyolefin resin", known additives, for example, a stabilizer, a releasing agent, an antistatic agent, a dispersant, a colorant such as a dye/pigment and the like, an antioxidant, or the like may be added to the above-mentioned polyolefin resin, in addition to the polyolefin resin. In a typical embodiment of the present invention, the content of these known additive components is at most 1 part by weight per 100 parts by weight of the polyolefin resin.

First, the raw material for a polyolefin pellet is introduced into the hopper 113. The raw material includes, for example, the polyolefin resin and the additives.

The raw material introduced into the hopper 113 is plasticized by the screw 112 in the inside of the cylinder 111, and extruded from the extrusion orifice 121 of the die 12 connected to the end of the cylinder 111.

Here, the average linear velocity u of the raw material passing through the extrusion orifice 121 as defined by the equation (Eq-1) is equal to or more than 50 mm/sec and equal to or less than 650 mm/sec.

Among these, the average linear velocity is preferably equal to or more than 100 mm/sec and equal to or less than 580 mm/sec.

If the average linear velocity of the raw material passing through the opening on the outlet side of the extrusion orifice 121 is too high, specifically, more than 650 mm/sec, the shape of the polyolefin pellets is likely to be in the cylindrical shape.

Further, if the average linear velocity of the raw material passing through the opening on the outlet side of the extrusion orifice 121 is too low, specifically, less than 50 mm/sec, the amount of the raw material extruded from the extrusion orifice 121 per unit time is low, and accordingly, it is difficult to obtain the polyolefin pellets in the spherical shape stably.

By setting the average linear velocity to equal to or more than 50 mm/sec and equal to or less than 650 mm/sec, there is a tendency that it is possible to prepare polyolefin pellets in the spherical shape stably.

Further, the virtual aspect ratio r as defined by the equation (Eq-2) is equal to or less than 1.6. Among those, the virtual aspect ratio r is preferably equal to or more than 0.3 and equal to or less than 1.3.

Polyolefin pellets in the spherical shape can be stably prepared by setting the virtual aspect ratio to equal to or less than 1.6 and satisfying the conditions (A) and (C).

Furthermore, as a result of investigation conducted by the present inventors, it was found that polyolefin pellets in the spherical shape can be prepared with good reproducibility by setting the virtual aspect ratio r to equal to or less than 0.9 or equal to or more than 1.1 and satisfying the conditions (A) and (C) according to the characteristics of the resin.

For example, in the case where a polyolefin resin having a melting point of equal to or lower than 80° C. is used, polyolefin pellets in the spherical shape can be prepared with good reproducibility by setting virtual aspect ratio r to equal to or less than 0.9.

Further, r/u as obtained by dividing the virtual aspect ratio r by the average linear velocity u is equal to or more than 0.002.

As described above, the virtual aspect ratio is not consistent with the actual aspect ratio of the polyolefin pellet, and the lower limit value of the virtual aspect ratios obtained from the polyolefin pellet in the spherical shape increases according to the increase in the average linear velocity.

Accordingly, polyolefin pellets in the spherical shape can be stably prepared by setting r/u to equal to or more than 0.002 under the conditions (A) and (B).

Among those, r/u is preferably equal to or less than 0.01, and more preferably equal to or less than 0.004.

Further, in order to make the shape of the polyolefin pellet spherical, it is preferable to change the virtual aspect ratio r according to the change in the average linear velocity u.

Specifically, by setting the preparation conditions in the range of $r \leq 002u$ and $r \leq 0.002u+0.65$, and preferably, r≤0.002u+0.5, polyolefin pellets in the spherical shape can be prepared with good reproducibility and with a high yield. In addition, by setting the preparation conditions in the range of r≤0.002u and r≤0.002u+0.65, and preferably r≤0.002u+0.5, polyolefin pellets with a high sphericity can also be prepared.

This is construed to be based on the following reasons.

As the average linear velocity of the raw material is higher, the polyolefin pellet is apt to swell in the perpendicular direction to the discharging direction from the extrusion orifice 121. For this, it is necessary to make the shape of the polyolefin pellet spherical by increasing the virtual aspect ratio according to the increase in the average linear velocity of the raw material.

Here, in the case of r≤0.002u+0.5 and an average linear velocity u of equal to or less than 300 mm/sec, polyolefin pellets in the spherical shape can be obtained with a higher yield.

However, the average linear velocity decreases by setting the virtual aspect ratio to at least a predetermined value. Specifically, if r is set to equal to or more than 1.1 and the average linear velocity u is set to equal to or less than 200 mm/sec, polyolefin pellets in the spherical shape can be prepared more stably even outside the range of r≤0.002u+0.65 in some cases.

In this case, it is preferable to use an ethylene-butene-1 copolymer and an ethylene-propylene copolymer as the raw material for a polyolefin.

Here, the radius R (mm) of the extrusion orifice is preferably equal to or more than 1.0 mm and equal to or less than 3.0 mm. Among those, R is more preferably equal to or more than 1.3 mm and equal to or less than 2.5 mm. By this, an effect of obtaining polyolefin pellets in the spherical shape more stably is attained.

Further, the cutting time t defined as an inverse number of the number which is obtained by multiplying the number of revolutions of the underwater cutter 14 by the number of blades 141 of the underwater cutter 14 is preferably equal to or more than 0.005 sec and equal to or less than 0.05 sec. By this, an effect that cutting failures such as whiskers and burrs, or occlusion problems can be reduced is attained.

Furthermore, the average volume V (mm$^3$) of the polyolefin pellet to be prepared is preferably equal to or more than 5 more and equal to or less than 70.

Among these, the average volume V (mm$^3$) of the polyolefin pellet to be prepared is particularly preferably equal to or more than 10. Also, the average volume V (mm$^3$) of the polyolefin pellet to be prepared is particularly preferably equal to or less than 50.

Polyolefin pellets in the spherical shape can be prepared more stably by setting the average volume V (mm$^3$) of the polyolefin pellet to equal to or more than 5.

In addition, an effect that fusion between the pellets is reduced due to lack of cooling is attained by setting the average volume V (mm$^3$) of the polyolefin pellet to equal to or less than 70.

If the average volume V (mm$^3$) of the polyolefin pellet is more than 70, there is a possibility that the pellet is not introduced into a screw of a molding machine such as an injection-molding machine and the like. In addition, if the average volume V (mm$^3$) is less than 5, when mixed with other resin pellets, this could lead to classification.

A cooling means, though not shown, is embedded in the vicinity of the opening on the outlet side of the extrusion orifice of the die 12, and the interior wall of the extrusion orifice 121 is cooled.

Further, the temperature of the interior wall of the extrusion orifice 121 can be considered to be uniform.

The temperature difference between the temperature of the interior wall of the extrusion orifice 121 of the die 12 and the temperature of the molten raw material immediately before being supplied to the extrusion orifice 121 of the die 12 allows the average linear velocity of the raw material to be controlled.

The raw material containing the polyolefin resin extruded from the extrusion orifice 121 is supplied to the inside of the water bath 13 and cut with the underwater cutter 14. The cut raw material is made into polyolefin pellets in the spherical shape in the water bath 13.

Further, the difference (T1−T2) between the temperature T1 of the molten raw material immediately before being supplied to the extrusion orifice 121 of the die 12 and the temperature T2 of the inlet point of the cutter box of the cooling medium (water in the present embodiment) in the water bath 13 is preferably equal to or higher than 135° C. Among those, it is more preferable to set the temperature to equal to or higher than 150° C. and equal to or lower than 330° C.

By this, an effect of further ensuring the obtaining of polyolefin pellets in the spherical shape is attained.

T1 is preferably equal to or higher than 150° C. and equal to or lower than 330° C., and T2 is preferably equal to or higher than 0° C. and equal to or lower than 60° C.

Next, the effective actions of the present embodiment will be described.

According to the present embodiment, polyolefin pellets in the spherical shape can be stably prepared.

More specifically, in the case where the average linear velocity u is more than 650 mm/sec, the shape of the polyolefin pellets is likely to be a cylindrical shape.

Further, in the case where the average linear velocity u is less than 50 mm/sec, it becomes difficult to obtain polyolefin pellets in the spherical shape stably. In addition, in the case where the average linear velocity is less than 50 mm/sec, the productivity of the polyolefin pellet would be lowered.

On the contrary, in the present embodiment, since the average linear velocity is equal to or less than 650 mm/sec and equal to or more than 50 mm/sec, the polyolefin pellet can be inhibited from being in the cylindrical shape or in the flat shape, and accordingly, polyolefin pellets in the spherical shape can be stably prepared.

Further, by setting the virtual aspect ratio to equal to or less than 1.6 under the conditions (A) and (C), polyolefin pellets in the spherical shape can be stably prepared.

In addition, polyolefin pellets in the spherical shape can be stably prepared setting r/u as obtained by dividing the virtual aspect ratio r by the average linear velocity to equal to or more than 0.002 under the conditions (A) and (B).

Furthermore, polyolefin pellets in the spherical shape can be prepared with higher reproducibility by setting the virtual aspect ratio to equal to or less than 0.9 or equal to or more than 1.1 according to the kinds of the resins under the conditions (A) and (C). For example, in the case where a resin having a melting point of equal to or lower than 80° C. is used, polyolefin pellets in the spherical shape can be more stably prepared by setting the virtual aspect ratio to equal to or less than 0.9.

Moreover, the yield of polyolefin pellets in the spherical shape can be increased by selecting r and u in the range of r≤0.002u and r≤0.002u+0.65, particularly in the range of r≤0.002u and r≤0.002u+0.5. Among these, if the average linear velocity u is set to equal to or less than 300 mm/sec, polyolefin pellets in the spherical shape can also be prepared in a higher yield.

On the other hand, in the case where the virtual aspect ratio r is set to equal to or more than 1.1 and the average linear velocity u is set to equal to or less than 200 mm/sec, polyolefin pellets in the spherical shape can be stably prepared.

Further, if the polyolefin resin is one or two or more resins selected from the group consisting of a (co)polymer of at least one monomer selected from ethylene, propylene, 1-butene, 1-hexene, 4-methyl-1-pentene, and 1-octene, and particularly a polymer having an ethylene-derived backbone concentration of equal to or more than 50 mol % (P1), a polymer having a propylene-derived backbone concentration of equal to or more than 50 mol % (P2), and a polymer having a 1-butene-derived backbone concentration of equal to or more than 50 mol % (P3), pellets in the spherical shape can be prepared more stably.

Further, the present invention is not limited to the embodiments as described above, and modifications, improvements or the like within the scope allowing the purposes of the present invention to be attained are included in the present invention.

For example, the polyolefin resin to be used is not limited to those exemplified by the embodiments as described above.

EXAMPLES

Next, Examples of the present invention will be described.

Example 1

By the same method as described as the embodiments, polyolefin pellets were prepared.

The polyolefin pellet was prepared under the preparation conditions as shown in Tables 1 and 2.

TABLE 1

| Raw material | Parts by weight |
|---|---|
| Polyolefin resin:<br>Ethylene-based polymer<br>(comonomer: propylene, MFR at<br>230° C. = 0. 60 g/10 min, TAFMER<br>(trade name) manufactured by Mitsui<br>Chemicals, Inc.) | 100 parts by weight |
| Additives | Phenol-based antioxidant<br>0.10 part by weight<br>Phosphorous-based antioxidant<br>0.15 part by weight |

TABLE 2

| Diameter of the die orifice (2 × R) | 3.5 mm |
|---|---|
| Temperature (T1) of the resin in the die inlet | 310° C. |
| Temperature (T2) of the cooling medium (water) in the cutter box inlet | 16° C. |
| Extrusion flow rate (Q) per orifice of the extrusion orifices | 963 mm$^3$/sec |
| Average linear velocity (u) | 110 mm$^3$/sec |
| Number of revolutions of the underwater cutter | 442 rpm |
| Number of blades of the underwater cutter | 8 sheets |
| Cutter time (t) | 0.017 sec |
| Virtual aspect ratio (r) | 0.49 |
| r/u | 0.004 |

Further, in Table 2, t is an inverse number of the number which is obtained by multiplying the number of revolutions of the underwater cutter by the number of blades of the underwater cutter.

Figure 3:
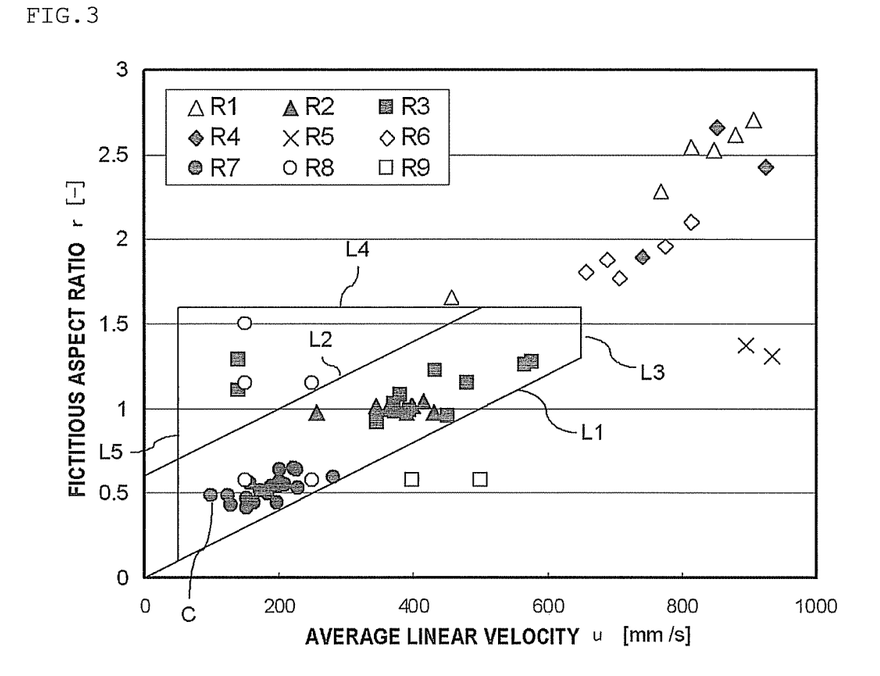
FIG. 3 is a view illustrating the virtual aspect ratios and the average linear velocities in Examples and Comparative Examples.

The preparation conditions in Table 2 correspond to Point C among the points of R7 as shown in FIG. 3.

Next, for each of the total 20 kinds consisting of 4 kinds of ethylene-propylene copolymers satisfying an MFR at 230° C. of 0.7 to 10 g/10 min, 4 kinds of ethylene-butene copolymers satisfying an MFR at 190° C. of 3 to 80 g/10 min, 3 kinds of ethylene-propylene copolymers satisfying an MFR at 190° C. of 0.4 to 4.3 g/10 min, 3 kinds of ethylene-butene copolymers satisfying an MFR at 230° C. of 0.3 to 45 g/10 min, and 6 kinds of propylene-based elastomers, which were each a polyolefin resin as a raw material, the extrusion flow rate Q and the cutting time t [=1/(number of revolutions×number of blades of the cutter)] among the preparation conditions in Table 2 varied. Specifically, Q was set to equal to or more than 1197 mm$^3$/sec and equal to or less than 2712 mm$^3$/sec. Further, t was set to equal to or more than 0.007 sec and equal to or less than 0.013 sec. According to the variance in Q and t, the values of the average linear velocity, the virtual aspect ratio, and r/u vary, but the other preparation conditions were the same as for Point C. The average linear velocity and the virtual aspect ratio are denoted by the points of R7 other than Point C in FIG. 3. Specifically, according to the change in the extrusion flow rates Q, the average linear velocity was set to equal to or more than 100 mm/s and equal to or less than 300 mm/s. Further, according to the change in the extrusion flow rates Q, the virtual aspect ratio was equal to or more than 0.3 and equal to or less than 0.7.

The raw material polyolefin resin of the point depicted by R7 has a melting point of equal to or lower than 80° C. The melting point was measured by means of a DSC method.

Example 2

Polyolefin pellets were prepared with each of various raw materials, wherein ethylene-butene copolymers (total 5 kinds of ethylene-based polymers (comonomer: butene) having a trade name of TAFMER manufactured by Mitsui Chemicals, Inc. and an MFR at 190° C. in the range of 0.5 to 4 g/10 min) were used as the raw materials. Depending on each of the various raw materials, the extrusion flow rate Q and the cutting time t varied, respectively. Specifically, Q was set to equal to or more than 1440 mm$^3$/sec and equal to or less than 2405 mm$^3$/sec. According to the variance in the extrusion flow rate Q and t, the values of the average linear velocity, the virtual aspect ratio, and r/u vary, but the other preparation conditions were the same as for Point C. The average linear velocity and the virtual aspect ratio of Example 2 were depicted by R8 in FIG. 3.

Specifically, according to the variance in the extrusion flow rate Q, the average linear velocity was set to equal to or more than 100 mm/s and equal to or less than 250 mm/s. Further, according to the change in the extrusion flow rate Q, the virtual aspect ratio was equal to or more than 0.6 and equal to or less than 1.5.

The others are the same as in Example 1.

The raw material polyolefin resin of the point depicted by R8 has a melting point of equal to or lower than 80° C. The melting point was measured by means of a DSC method.

Example 3

Polyolefin pellets were prepared with each of the various raw materials, wherein propylene-ethylene copolymers (total 2 kinds of propylene-based polymers (comonomer: ethylene) having a trade name of TAFMER manufactured by Mitsui Chemicals, Inc. and satisfying an MFR at 230° C. of 0.35 g/10 min and 1.0 g/10 min, respectively), propylene-based polymers (total 2 kinds of propylene-based polymers (comonomer: butene) having a trade name of TAFMER manufactured by Mitsui Chemicals, Inc. and satisfying an MFR at 230° C. of 6 g/10 min and 8 g/10 min, respectively), butene-based polymers (total 2 kinds of butene-based polymers (comonomer: ethylene) having a trade name of TAFMER manufactured by Mitsui Chemicals, Inc. and satisfying an MFR at 190° C. of 1 g/10 min and 4 g/10 min, respectively), butene-based polymers (total 2 kinds (comonomer: ethylene) having a trade name of TAFMER manufactured by Mitsui Chemicals, Inc. and satisfying an MFR at 190° C. of 2 g/10 min and 4 g/10 min, respectively), and polybutenes (total 3 kinds of polybutenes having a trade name of TAFMER manufactured by Mitsui Chemicals, Inc. and satisfying an MFR at 190° C.=0.1 to 23 g/10 min) were used as the raw materials. Depending on each of the various raw materials, the extrusion flow rate Q, the orifice diameter R, and the cutting time t varied, respectively. Specifically, Q was set to equal to or more than 1357 mm$^3$/sec and equal to or less than 4084 mm$^3$/sec. Further, R was set to equal to or more than 3.0 mm and equal to or less than 3.5 mm. In addition, t was set to equal to or more than 0.06 sec and equal to or less than 0.032 sec. According to the variance in Q, R, and t, the values of the average linear velocity, the virtual aspect ratio, and r/u vary. The other preparation conditions were the same as for Point C. The average linear velocity and the virtual aspect ratio of Example 3 were depicted by R3 in FIG. 3.

Specifically, according to the variance in the extrusion flow rate Q, the average linear velocity was set to equal to or more than 130 mm/s and equal to or less than 600 mm/s. Further, according to the variance in the extrusion flow rate Q, the virtual aspect ratio was equal to or more than 0.8 and equal to or less than 1.3.

Example 4

Polyolefin pellets were prepared with each of various raw materials, wherein low-density polyethylenes (ethylene-based polymers (comonomer: hexene, total 10 kinds) having a trade name of EVOLU manufactured by Prime Polymer Co., Ltd., and satisfying an MFR at 190° C. in the range of 0.5 to 4.5 g/10 min) were used as the raw materials. Depending on each of the various raw materials, the extrusion flow rate Q and the cutting time t varied, respectively. Specifically, Q was set to equal to or more than 2324 mm$^3$/sec and equal to or less than 3918 mm$^3$/sec. Further, t was set to equal to or more than 0.008 sec and equal to or less than 0.0130 sec. According to the variance in Q and t, the values of the average linear velocity, the virtual aspect ratio, and r/u vary. The other preparation conditions were the same as for Point C. The average linear velocity and the virtual aspect ratio of Example 4 were depicted by R2 in FIG. 3.

Specifically, according to the variance in the extrusion flow rate Q, the average linear velocity was set to equal to or more than 250 mm/s and equal to or less than 450 mm/s. Further, according to the variance in the extrusion flow rate Q, the virtual aspect ratio was equal to or more than 0.9 and equal to or less than 1.1.

Comparative Example 1

Polyolefin pellets were prepared with each of various raw materials, wherein low-density polyethylenes (2 kinds having a trade name of ULT-ZEX manufactured by Prime Polymer Co., Ltd. and satisfying an MFR at 190° C. of 19 g/10 min and 21 g/10 min, respectively, and 3 kinds having a trade name of NEO-ZEX manufactured by Prime Polymer Co., Ltd. and satisfying an MFR at 190° C. of 0.8 to 3.4 g/10 min, respectively) were used as the raw materials. Depending on each of the various raw materials, the extrusion flow rate Q, the orifice diameter R, and the cutting time t varied, respectively. Specifically, Q was set to equal to or more than 3770 mm$^3$/sec and equal to or less than 4664 mm$^3$/sec. Further, R was set to 2.7 mm and t was set to 0.007 sec. According to the variance in Q, R, and t, the values of the average linear velocity, the virtual aspect ratio, and r/u vary. The other preparation conditions were the same as for Point C. The average linear velocity and the virtual aspect ratio of Comparative Example 1 were depicted by R6 in FIG. 3.

Specifically, according to the variance in the extrusion flow rate Q, the average linear velocity was set to equal to or more than 660 mm/s and equal to or less than 850 mm/s. Further, according to the change in the extrusion flow rate Q, the virtual aspect ratio was equal to or more than 1.7.

Comparative Example 2

Polyolefin pellets were prepared with each of various raw materials, wherein random polypropylenes (total 3 kinds manufactured by Prime Polymer Co., Ltd., using ethylene and butene as the comonomers and satisfying an MFR at 230° C. in the range of 6.5 to 30 g/10 min) were used as the raw materials. Depending on each of the various raw materials, the extrusion flow rate Q, the orifice diameter R, and the cutting time t varied, respectively. Specifically, Q was set to equal to or more than 3079 mm$^3$/sec and equal to or less than 3540 mm$^3$/sec. Further, R was set to 2.3 mm and t was set to equal to or more than 0.006 sec and equal to or less than 0.007 sec. According to the variance in Q, R, and t, the values of the average linear velocity, the virtual aspect ratio, and r/u vary. The other preparation conditions were the same as for Point C. The average linear velocity and the virtual aspect ratio of Comparative Example 2 were depicted by R4 in FIG. 3.

Specifically, according to the variance in the extrusion flow rate Q, the average linear velocity was set to equal to or more than 700 mm/s and equal to or less than 1000 mm/s. Further, according to the change in the extrusion flow rate Q, the virtual aspect ratio was equal to or more than 1.8.

Comparative Example 3

Polyolefin pellets were prepared with each of various raw materials, wherein random polypropylenes (total 2 kinds manufactured by Prime Polymer Co., Ltd., using ethylene as a comonomer and satisfying an MFR at 230° C. in the range of 20 to 35 g/10 min) were used as the raw materials. Depending on each of the various raw materials, the extrusion flow rate Q, the orifice diameter R, and the cutting time t varied, respectively. Specifically, Q was set to equal to or more than 5128 mm$^3$/sec and equal to or less than 5350 mm$^3$/sec. Further, R was set to 2.3 mm and t was set to 0.004 sec. According to the variance in Q, R, and t, the values of the average linear velocity, the virtual aspect ratio, and r/u vary. The average linear velocity and the virtual aspect ratio of Comparative Example 3 were depicted by R5 in FIG. 3.

Specifically, according to the variance in the extrusion flow rate Q, the average linear velocity was set to equal to or more than 850 mm/s and equal to or less than 1000 mm/s. Further, according to the change in the extrusion flow rate Q, the virtual aspect ratio was equal to or more than 1.2 and equal to or less than 1.5.

Comparative Example 4

Polyolefin pellets were prepared with each of various raw materials, wherein high-density polyethylenes (total 6 kinds manufactured by Prime Polymer Co., Ltd., satisfying a density of 945 to 965 kg/m3 and an MFR at 190° C. in the range of 0.3 to 7 g/10 min) were used as the raw materials. Depending on each of the various raw materials, the extrusion flow rate Q, the orifice diameter R, and the cutting time t varied, respectively. Specifically, Q was set to equal to or more than 2073 mm³/sec and equal to or less than 4107 mm³/sec. Further, R was set to 2.4 mm and t was set to equal to or more than 0.007 sec and equal to or less than 0.008 sec. According to the variance in Q, R, and t, the values of the average linear velocity, the virtual aspect ratio, and r/u vary. The other preparation conditions were the same as for Point C. The average linear velocity and the virtual aspect ratio of Comparative Example 4 were depicted by R1 in FIG. 3.

Specifically, according to the variance in the extrusion flow rate Q, the average linear velocity was set to equal to or more than 450 mm/s and equal to or less than 1000 mm/s. Further, according to the change in the extrusion flow rate Q, the virtual aspect ratio was equal to or more than 1.7.

Comparative Example 5

Polyolefin pellets were prepared with each of various raw materials, wherein ethylene-based polymers (total 2 kinds having a trade name of TAFMER manufactured by Mitsui Chemicals, Inc. (comonomer: propylene) and satisfying an MFR at 190° C. of 2.9 to 4.3 g/10 min) were used as the raw materials. Depending on each of the various raw materials, the extrusion flow rate Q and the cutting time t varied, respectively. Specifically, Q was set to equal to or more than 3848 mm³/sec and equal to or less than 4811 mm³/sec. According to the variance in Q and t, the values of the average linear velocity, the virtual aspect ratio, and r/u vary. The other preparation conditions were the same as for Point C. The average linear velocity and the virtual aspect ratio of Comparative Example 5 were depicted by R9 in FIG. 3.

Specifically, according to the variance in the extrusion flow rate Q, the average linear velocity was set to equal to or more than 400 mm/s and equal to or less than 510 mm/s. Further, according to the change in the extrusion flow rate Q, the virtual aspect ratio was 0.55.

In Examples 1 to 4 and Comparative Examples 1 to 5, 100 to 150 polyolefin pellets prepared under each of the preparation conditions were randomly taken per preparation condition (each of the points in FIG. 3), and observed with the naked eyes or by a lupe. In Examples 1 to 4, under each of the preparation conditions, the ratio of the polyolefin pellets in the spherical shape in terms of the numbers was equal to or more than 90%.

In Examples 1 through 4, it was confirmed that polyolefin pellets in the spherical shape can be stably prepared. That is, under the condition in the area surrounded by the straight lines L1, L3, L4, and L5 in FIG. 3, polyolefin pellets in the spherical shape could be prepared stably.

The straight line L1 indicates r=0.002u, and the straight line L3 indicates u=650 mm/s. Also, the straight line L4 indicates r=1.6, and the straight line L5 indicates u=50 mm/s.

Further, it was found that polyolefin pellets in the spherical shape can be prepared with a good reproducibility by setting r to equal to or less than 0.9 and equal to or more than 1.1 depending of the kind of the raw materials. For example, in the case where a raw material having a melting point of equal to or lower than 80° C. is used, polyolefin pellets in the spherical shape could be prepared with good reproducibility by selecting r in the range of equal to or less than 0.9.

In addition, in the range of r≤0.002u (the straight line L1 in FIG. 3) and r≤0.002u+0.65 (the straight line L2 in FIG. 3), polyolefin pellets in the spherical shape could be obtained with good reproducibility. Further, the obtained polyolefin pellets were in the spherical shape, having extremely little significant change in the curvatures of the entire shape of the pellets, and had a high sphericity. In addition, the yield of the polyolefin pellets in the spherical shape was high.

Furthermore, in the range of r≥0.002u (the straight line L1 in FIG. 3) and r≤0.002u+0.5 and with an average linear velocity of equal to or less than 300 mm/s, the yield of the polyolefin pellets in the spherical shape was very high. It was found that among these, one having r of equal to or less than 0.9 was preferred.

On the other hand, in Comparative Example 5, in the point of R9, the polyolefin pellets were in the flat shape of a Go stone, and accordingly, polyolefin pellets in the spherical shape could not be substantially obtained.

Further, in Comparative Examples 1 to 4, the polyolefin pellets were in the cylindrical shape, and accordingly, polyolefin pellets in the spherical shape could not be substantially obtained.

In addition, it was revealed that when r/u is in the range of less than 0.002 and u is in the range of equal to or less than 350 mm/sec, the number of the polyolefin pellets in the flat shapes increased, and accordingly, polyolefin pellets in the spherical shape could not be substantially obtained.

The invention claimed is:

1. A method for preparing polyolefin pellets in a spherical shape by cutting a raw material containing a molten polyolefin resin which is extruded from an extrusion orifice formed on a die surface of a die into a predetermined length with an underwater cutter which is set in close vicinity to said die surface of said die and rotates in water, thereby obtaining polyolefin pellets, wherein the method satisfies the following conditions (A) to (C) simultaneously:
(A) an average linear velocity u of said raw material passing through said extrusion orifice as defined by the equation (Eq-1) is equal to or more than 50 mm/sec and equal to or less than 650 mm/sec,
(B) a virtual aspect ratio r as defined by the equation (Eq-2) is equal to or less than 1.6, and
(C) r/u as obtained by dividing the virtual aspect ratio r by the average linear velocity u is equal to or more than 0.002, $$u = \frac{Q}{\pi \times R^2} \quad \text{(Eq-1)}$$

$$r = \frac{Q \times t}{2 \times \pi \times R^3} \quad \text{(Eq-2)}$$

in said equations (Eq-1) and (Eq-2), Q is an extrusion flow rate (mm³/sec) of said raw material per orifice of the extrusion orifices. R is a radius (mm) of the extrusion orifice, and more than 1.0 mm and equal to or less than 3.0 mm, and t is a cutting time (sec) defined as an inverse number of the number which is obtained by multiplying the number of revolutions of the underwater cutter by the number of blades of the underwater cutter, and more than 0.005 sec and equal to or less than 0.05 sec.

2. The method for preparing polyolefin pellets as set forth in claim 1, wherein
said r is equal to or less than 0.9 or said r is equal to or more than 1.1 and equal to or less than 1.6.

3. The method for preparing polyolefin pellets as set forth in claim 2, wherein said r is equal to or less than 0.9, and
said polyolefin resin has a melting point of equal to or lower than 80° C.

4. The method for preparing polyolefin pellets as set forth in claim 1, wherein
said r is more than 0.9 and less than 1.1.

5. The method for preparing polyolefin pellets as set forth in claim 1, wherein $r \leq 0.002u+0.65$.

6. The method for preparing polyolefin pellets as set forth in claim 5, wherein $r \leq 0.002u+0.5$.

7. The method for preparing polyolefin pellets as set forth in claim 6, wherein
the average linear velocity u is equal to or less than 300 mm/sec.

8. The method for preparing polyolefin pellets as set forth in claim 1, wherein
the average linear velocity u is equal to or less than 200 mm/sec, and said virtual aspect ratio r is equal to or more than 1.1 and equal to or less than 1.6.

9. The method for preparing polyolefin pellets as set forth in claim 1, wherein said polyolefin resin is a (co)polymer of at least one monomer selected from ethylene, propylene, 1-butene, 1-hexene, 4-methyl-1-pentene, and 1-octene.

10. The method for preparing polyolefin pellets as set forth in claim 2, wherein $r \leq 0.002u+0.65$.

11. The method for preparing polyolefin pellets as set forth in claim 3, wherein $r \leq 0.002u+0.65$.

12. The method for preparing polyolefin pellets as set forth in claim 4, wherein $r \leq 0.002u+0.65$.

13. The method for preparing polyolefin pellets as set forth in claim 1, wherein
R is equal to or more than 1.3 mm and equal to or less than 2.5 mm.

* * * * *